July 24, 1928.
A. E. COOK
AUTO MARINE VEHICLE
Filed Aug. 29, 1925  2 Sheets-Sheet 1
1,678,180
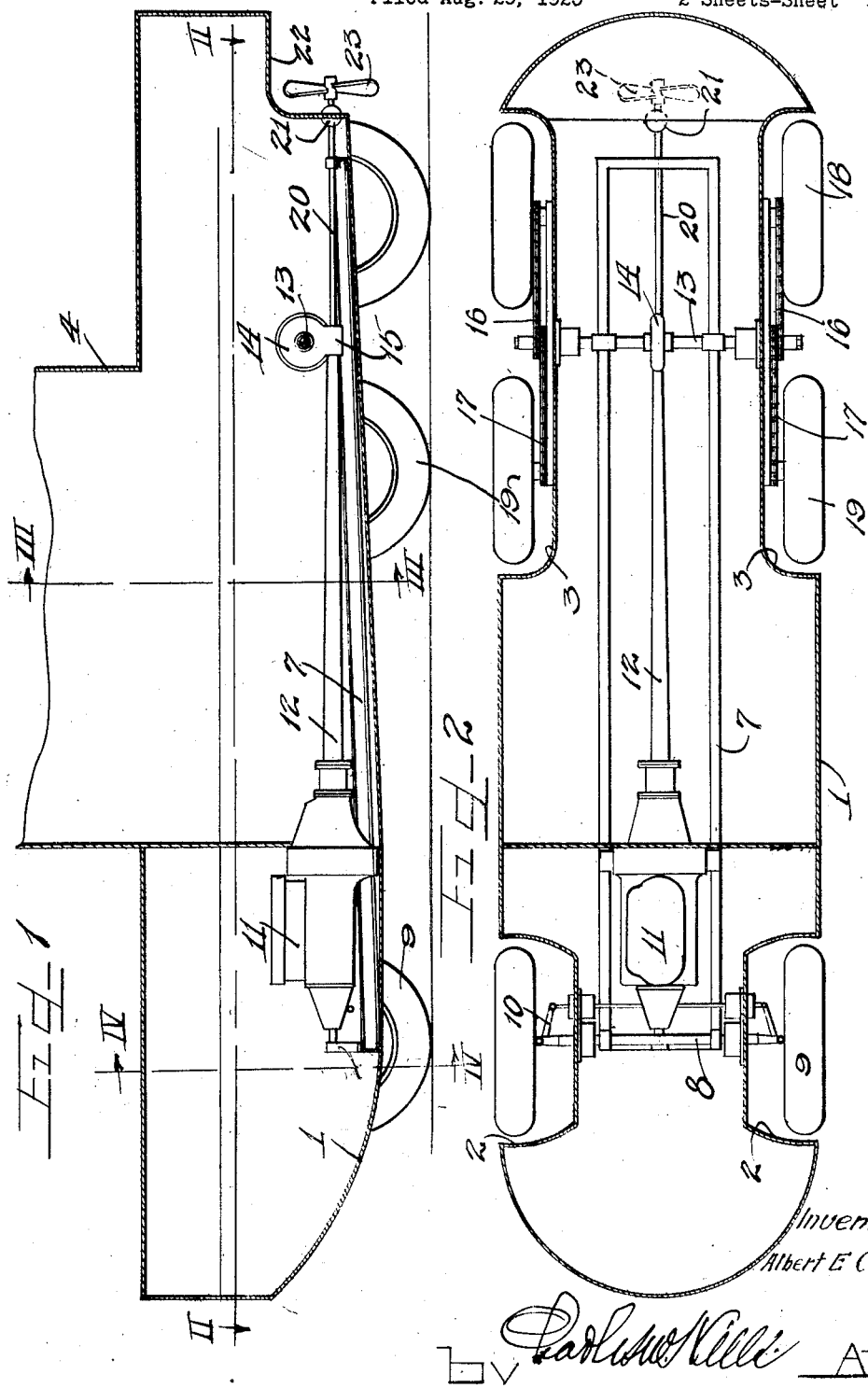

July 24, 1928.
A. E. COOK
AUTO MARINE VEHICLE
Filed Aug. 29, 1925    2 Sheets-Sheet 2
1,678,180
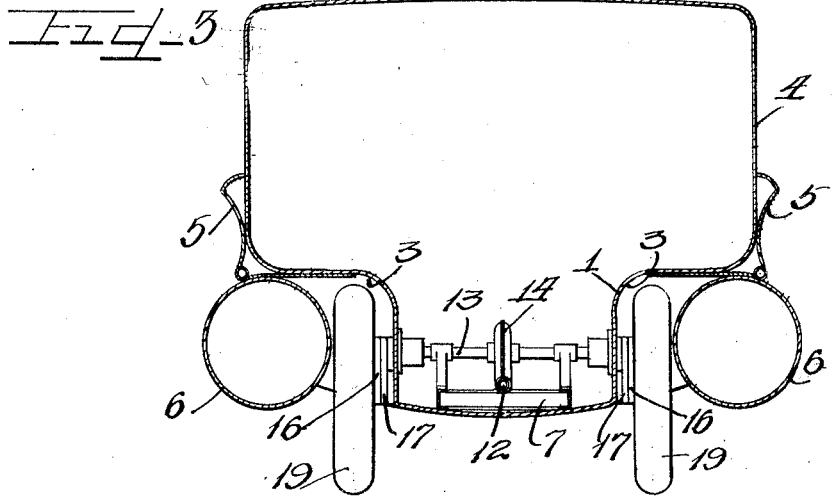
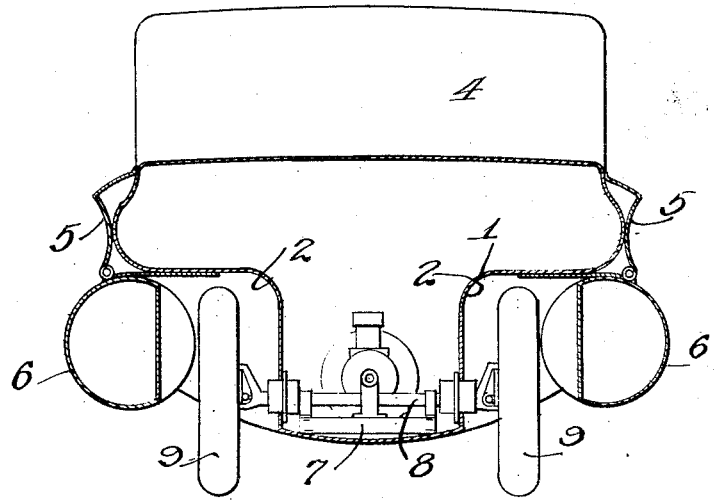
Inventor
Albert E. Cook.
by Chadlow Nills
Attys Patented July 24, 1928.

1,678,180

UNITED STATES PATENT OFFICE.

ALBERT E. COOK, OF EVANSTON, ILLINOIS, ASSIGNOR TO CHARLES B. COOK, OF CHICAGO, ILLINOIS.

AUTO MARINE VEHICLE.

Application filed August 29, 1925. Serial No. 53,265.

It is an object of this invention to provide an auto marine vehicle with a standard automobile chassis to permit the vehicle to be driven either on land or in the water.

It is also an object of this invention to provide an auto marine vehicle in which an automobile chassis is mounted, said chassis having the driving axle and differential inverted.

It is a further object of this invention to provide an auto marine vehicle with a standard automobile chassis having the differential and rear driving axle positioned above the chassis and connected with suitable means to permit the vehicle to be driven on land as well as in the water.

It is an important object of this invention to provide an improved auto marine vehicle adapted to have a standard automobile chassis disposed therein with the rear axle and differential inverted and connected with rear driving wheels and with a propeller mechanism, both of which are adapted to be driven from the automobile engine supported on said chassis.

Other and further important objects of this invention will be apparent from the disclosures in the specification and the accompanying drawings.

This invention (in a preferred form) is illustrated in the drawings and hereinafter more fully described.

On the drawings:

Figure 1 is a fragmentary longitudinal section of an improved auto marine vehicle embodying the principles of this invention and showing parts in elevation.

Figure 2 is a longitudinal horizontal section taken on line II—II of Figure 1.

Figure 3 is a transverse vertical section taken on line III—III of Figure 1.

Figure 4 is a transverse vertical section taken on line IV—IV of Figure 1 with parts in elevation.

As shown on the drawings:

The reference numeral 1 indicates an auto marine vehicle hull or body provided near its front end with front wheel pockets or recesses 2 and near its rear end with rear wheel recesses or pockets 3. The auto marine body has mounted or formed thereon a top section 4 of any desired shape and construction.

Formed on each side of the vehicle body 1 are pontoon pockets 5. Pivotally supported on each side of the body 1 are pontoons 6 adapted to be swung from their lower positions illustrated in Figures 3 and 4, into their upper positions to seat in the pontoon pockets 5.

The body 1 is so constructed to permit an automobile chassis framework 7 to be mounted longitudinally therein with the front axle mechanism 8 mounted above the framework 7 and so positioned that the ends of the axle project into the body recesses 2. Mounted on the front axle within the recesses 2 are the front wheels 9 of the auto marine vehicle. Connected with the front wheels is a steering mechanism 10 adapted to be operated by means of a steering wheel or other standard equipment (not shown). Supported on the chassis framework 7 is the automobile power plant or engine 11 which drives the driving shaft disposed within a driving shaft housing 12 forming part of the chassis equipment. The rear axle 13 of the chassis is inverted and is positioned above the chassis frame 7 instead of below the same when the chassis is used as part of an automobile. The differential 14 is also inverted and is disposed around the rear axle 13 as clearly illustrated in Figure 1. A drive from the engine 11 is transmitted by means of the driving shaft within the housing 12 to a worm within the worm housing 15 which in turn drives the differential gears within the differential gear housing 14. The differential gears transmit the drive to the rear axle 13 the ends of which project through the housing 1 into the rear housing pockets 3. Mounted on the projecting ends of the rear axle 13 are sprockets which drive chains 16 and 17. The chains 16 and 17 are adapted to transmit the drive from the rear axle 13 to two sets of rear driving wheels 18 and 19. The rear wheels 18 and 19 are positioned within the rear housing pockets 3.

A propeller shaft 20 is supported on the chassis framework and connected to receive a drive from the differential. The rear end of the propeller shaft projects through a suitable bearing housing 21 out into a rear pocket or recess 22 provided at the bottom rear portion of the auto marine housing 1. A propeller 23 is mounted on the projecting end of the propeller shaft 20.

It will thus be seen that an auto marine vehicle of simple construction is provided wherein an automobile chassis and engine are adapted to be mounted as a unit within the automarine housing with the rear axle and differential inverted and connected to drive the propeller 23. The rear wheels of the automobile are replaced by the rear auto marine wheels 18 and 19 which are adapted to be driven through the continuous sprocket chains 16 and 17. The front wheels 19 of the automobile are adapted to serve as the front wheels of the auto marine vehicle. The adaptation of a chassis and power plant of an automobile for use in an auto marine body affords a simplified and convenient arrangement for an improved auto marine vehicle adapted to be used on land or in water as desired.

I am aware that many changes may be made, and numerous details of construction may be varied through a wide range without departing from the principles of this invention, and I therefore do not purpose limiting the patent granted hereon otherwise than necessitated by the prior art.

I claim as my invention:

1. An auto marine vehicle comprising a body, wheels supporting the same, an automobile chassis framework mounted within the body, shafts mounted thereabove and supporting said wheels, a propeller mechanism supported by the body and an automobile power plant mechanism supported on the chassis framework and connected to drive the rear wheels and said propeller mechanism.

2. The combination with an auto marine vehicle housing, of front and rear wheels supporting the same, a propeller mechanism supported by the housing, an automobile chassis framework mounted within the housing, an automobile power plant supported on said framework, and a rear axle and differential inverted and supported above the framework to drive the rear vehicle wheels and said propeller mechanism.

3. A land and water vehicle comprising a body, a propeller mechanism supported thereon, an automobile chassis framework disposed within said body, front and rear axles and a differential mounted above the framework with the axles projecting through the body, front wheels supported on the projecting ends of said front axle, rear wheels supported on the body, means connecting the rear automobile wheels with the rear axle to receive a drive therefrom and means for connecting the propeller mechanism with said rear axle and differential.

In testimony whereof I have hereunto subscribed my name.

ALBERT E. COOK.